United States Patent [19]
Chiavarotti et al.

[11] Patent Number: 6,003,509
[45] Date of Patent: *Dec. 21, 1999

[54] SOLAR COLLECTOR AND METHOD FOR PRODUCTION THEREOF

[75] Inventors: Giovanni Pietro Chiavarotti, Milan; Francesco di Quarto, Palermo; Salvatore Piazza, Palermo; Carmelo Sunseri, Palermo, all of Italy

[73] Assignee: Becromal S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/535,918

[22] Filed: Sep. 28, 1995

[30] Foreign Application Priority Data

Sep. 28, 1994 [DE] Germany ............... 44 34 556

[51] Int. Cl.⁶ .................................. F24J 2/00
[52] U.S. Cl. ................. 126/714; 126/908; 205/171; 205/640
[58] Field of Search .................. 205/170, 171, 205/213, 223, 181, 640; 126/908, 569, 714

[56] References Cited

U.S. PATENT DOCUMENTS

| | | | |
|---|---|---|---|
| 3,048,375 | 8/1962 | Walker | 165/904 |
| 3,987,783 | 10/1976 | Powell | 126/661 |
| 4,440,606 | 4/1984 | Powers et al. | |
| 4,442,829 | 4/1984 | Yanagida et al. | 126/908 |
| 4,511,439 | 4/1985 | Cornils et al. | 126/908 |
| 5,695,628 | 12/1997 | Chiavarotti et al. | 205/340 |

FOREIGN PATENT DOCUMENTS

| | | | |
|---|---|---|---|
| 2345675 | 10/1977 | France . | |
| 2506440 | 11/1982 | France . | |
| 2850134 | 5/1979 | Germany | 126/908 |
| 23459 | 5/1988 | Japan | 126/908 |

OTHER PUBLICATIONS

NASA Tech Brief, "Selective Coating for Collecting Solar Energy on Aluminum", NASA Case No. MFS–22562, Jan. 1974.

Patent Abstracts of Japan, vol. 8, No. 35 (M–276), Feb. 15, 1984 & JP 58 190651 A (Shiyouwa Aruminiumu KK), Nov. 7, 1983, * Abstract *.

Patent Abstracts of Japan, vol. 4, No. 22 (C–74), Feb. 23, 1980 & JP 54 160528 A (Agency of Ind. Science and Technol.), Dec. 19, 1979, * Abstract *.

Primary Examiner—James C. Yeung
Attorney, Agent, or Firm—Wenderoth, Lind & Ponack, L.L.P.

[57] ABSTRACT

A solar collector for absorbing solar energy and for conversation thereof into thermal energy includes an aluminum foil. One side only of the aluminum foil is blackened to an extent such that it will absorb solar energy, preferably to an extent approximating a black body. The blackening is achieved by subjecting the one surface of the aluminum foil to an electrochemical surface etching treatment.

12 Claims, 2 Drawing Sheets

SOLAR COLLECTOR AND METHOD FOR PRODUCTION THEREOF

BACKGROUND OF THE INVENTION

The present invention relates to a solar collector for absorbing solar energy and for converting such solar energy into thermal energy. The invention particularly relates to such a solar collector formed from aluminum foil. The present invention also relates to a method for production of such solar collector.

The term "solar collector" in the broadest sense is employed to mean any radiation receiver that responds to electromagnetic radiation and converts it into thermal energy. Examples of such radiation receivers are, inter alia, bolometers, thermal converters, and similar devices. One problem with solar collectors or radiation receivers is bringing the absorption capacity of the surface acted upon by the electromagnetic radiation near to the value 1. Those bodies that have the absorption capacity 1, that is to say that absorb all incident radiation and convert it fully into heat, are referred to as "black bodies". Black bodies or black radiators/emitters in practice are formed by a cavity having a small opening. The walls of the cavity are impermeable or impenetrable to electromagnetic radiation of all wavelengths, so that a radiation equilibrium becomes established in the cavity. Black bodies of this type however are unsuitable for use as solar collectors.

SUMMARY OF THE INVENTION

With the above discussion in mind, it is an object of the present invention to provide a solar collector, and a method for production thereof, wherein the solar collector is formed from an aluminum foil.

This object is achieved by use of an aluminum foil that is blackened only on one side thereof, the opposite side remaining unblackened. Such blackening preferably is to an extent such that the blackened side approximates a black body with respect to absorption capacity. While the blackened side of the aluminum foil is exposed to solar radiation, due to the high absorption capacity thereof, it will absorb the solar radiation at a high degree of efficiency and effectiveness. The thermal energy thus absorbed into the aluminum foil can be absorbed/collected and lead off or transferred away by suitable means provided at the non-blackened side of the aluminum foil.

In accordance with a particular aspect of the present invention, the blackening is produced by surface etching of the one side of the foil. The etching process produces controlled dissolution of the aluminum by creation of pits and tunnels that result in an increase of the area of the side of the aluminum foil. In an advantageous further aspect of the invention, the blackening is produced by electrochemical surface etching in a chloride solution. Cl⁻ ions are responsible for dissolution of the aluminum. It has proved to be advantageous to add as components/additives to the chloride solution organic and/or inorganic acids and/or aluminum salts thereof. One or more acids from the following group are preferred to preserve the complete dissolution of the surface, namely phosphoric acid, oxalic acid, tartaric acid, citric acid.

Advantageously, the surface etching treatment is carried out at solution temperatures in the range of between approximately 20° C. and approximately 60° C. The blackening by surface etching advantageously is carried out with the application of direct current and/or alternating current of a frequency between 5 Hz and 100 Hz and/or in current pulses with a duty cycle of between 0.05 and 0.95. In practice, currents having an average current density in the range of between approximately 0.06 A/cm$^2$ and 1.8 A/cm$^2$ have been used.

In accordance with a further features of the invention, aluminum foils having a thickness in the range of between approximately 15 μm and 300 μm are used.

Further, structure for absorbing and transferring absorbed energy can be applied to the non-blackened side of the aluminum foil.

BRIEF DESCRIPTION OF THE DRAWINGS

Other objects, features, advantages and possible uses of the invention will be discussed in more detail below with reference to the accompanying drawings, wherein.

DETAILED DESCRIPTION OF THE INVENTION

Figure 2:
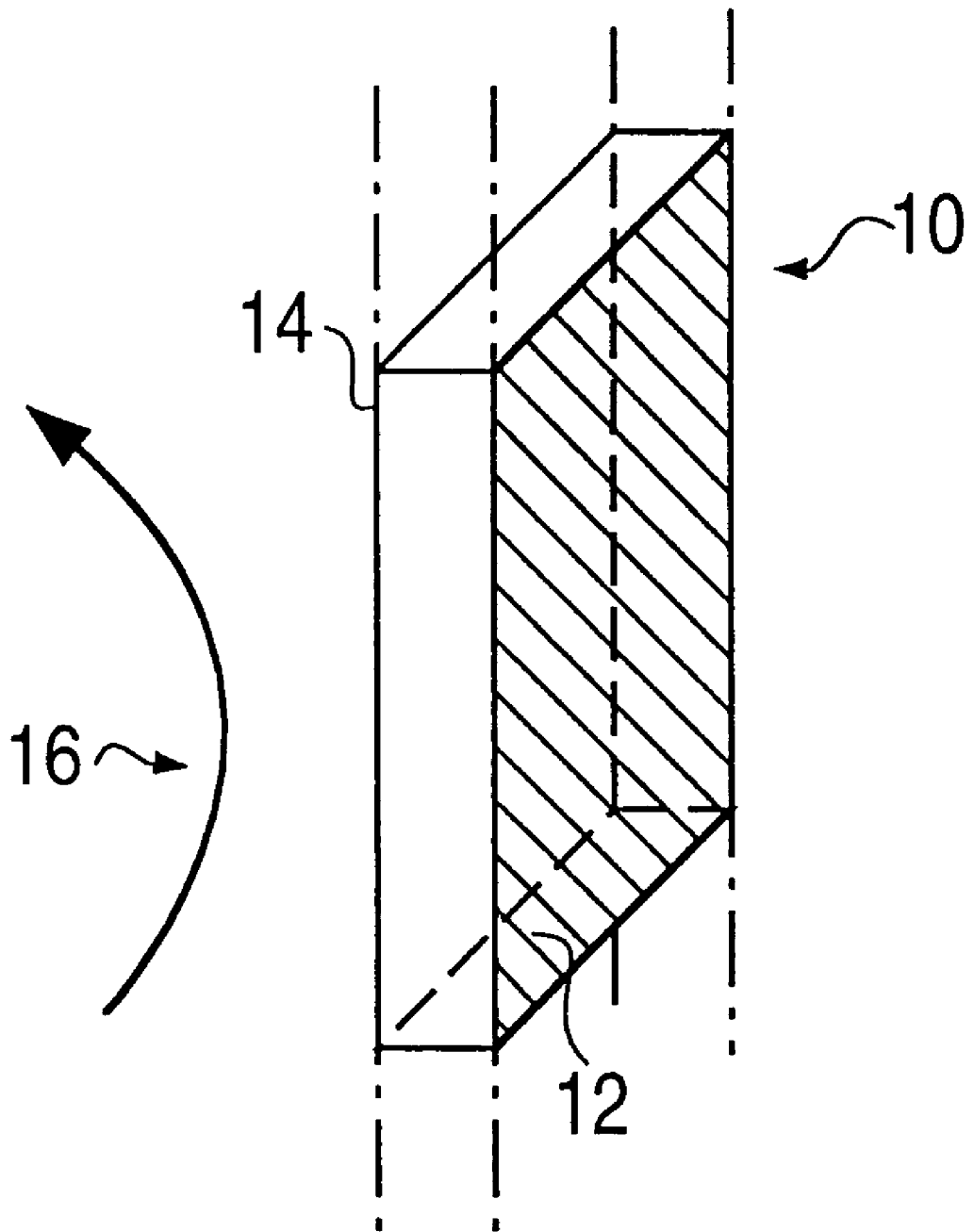
FIG. 2 is a schematic perspective view illustrating a solar collector in accordance with the present invention.

In FIG. 2 is schematically illustrated a solar collector 10 in accordance with the present invention. Solar collector 10 is formed of an aluminum foil having opposite first and second sides 12, 14. Side 12 is subjected to a surface etching treatment, to be discussed in more detail below, such that surface 12 is blackened, preferably sufficiently to approximate a black body. Only surface 12 is so treated, and opposite surface 14 remains unblackened. Solar/electromagnetic radiation impinging on blackened surface 12 is absorbed thereby. This absorbed energy is converted into thermal energy that becomes available at the unblackened surface 14. There is provided at surface 14 means, shown schematically at 16, for collecting/absorbing and transferring the absorbed thermal/heat energy. Such means may be, for example, materials of high heat conducting and/or storage capacity, or alternatively may be fluid media the temperature of which is increased by the collected thermal energy, so that such thermal energy can be conveyed to a position of utilization, if desired.

Figure 1:
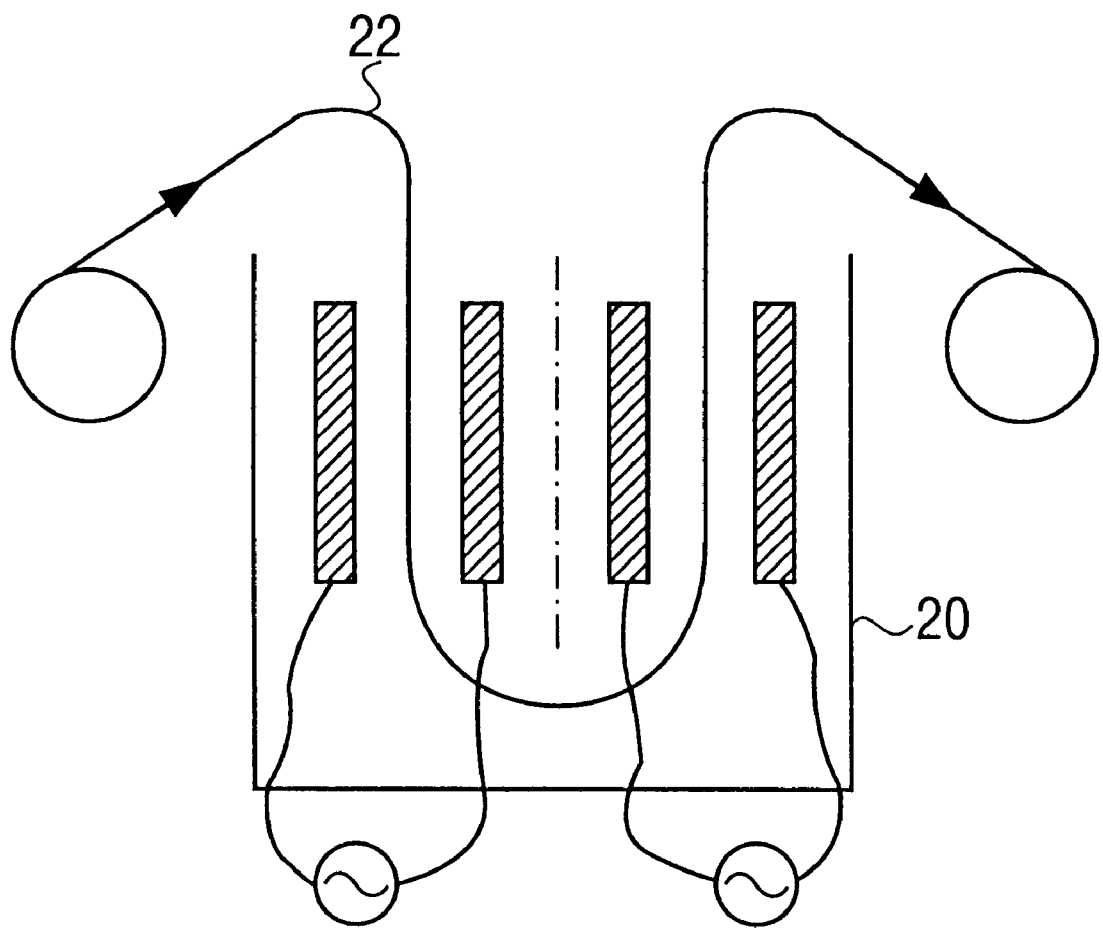
FIG. 1 is a schematic view illustrating a process of treatment of aluminum foil to form a solar collector according to one embodiment of the present invention.

FIG. 1 shows schematically one method for subjecting one surface of an aluminum foil to a surface etching treatment sufficient to achieve blackening thereof. Thus, a suitable container 20 contains therein a surface etching solution, preferably a chloride solution. A long length of aluminum foil is passed through the solution under conditions such that one surface only of the aluminum foil is subjected to the solution, with the opposite surface of the aluminum foil being isolated from the solution. The solution surface etches the one surface of the aluminum foil to an extent to achieve blackening thereof sufficient to enable such surface to absorb solar energy. Preferably, such surface etching treatment results in blackening sufficient to approximate a black body. The resultant long length of treated aluminum foil then may be collected as schematically illustrated and subsequently formed into solar collectors 10. The aluminum foil has a thickness in a range between 15 μm and 300 μm.

The solution in container 20 is a chloride solution, and can contain various additives of organic and/or inorganic acids, preferably phosphoric acid, oxalic acid, tartaric acid and/or citric acid and aluminum or aluminum salts. During the etching treatment operation, the solution has a temperature in the range of between 20° C. and approximately 60° C. The etching treatment is carried out by the action of a current, whereby direct current, pulsed current, alternating current or a combination thereof are used. It is possible for the frequency of alternating current to be varied between 5 Hz and 100 Hz. The current may be applied in current pulses with a duty cycle between 0.50 and 0.95. The current may be applied to act at a current density in the range of between approximately 0.06 A/cm$^2$ to 1.8 A/cm$^2$.

By subjecting the aluminum foil to such electrochemical surface etching treatment, one side only of the aluminum foil is blackened until the absorption capacity thereof substantially approximates the absorption capacity of a black body. As a result of such features, an extremely high degree of efficiency of conversion of solar energy into thermal energy is achieved.

Although the present invention has been described and illustrated with respect to preferred features thereof, it is to be understood that various alterations may be made to the specifically described and illustrated features without departing from the scope of the present invention. It is to be understood that the scope of the present invention is intended to encompass all features described and illustrated, independently or in any appropriate combination, and that one of ordinary skill in the art, upon reviewing the present disclosure, would be able to contemplate such alterations.

We claim:

1. A method of production of a solar collector to be used for absorbing solar energy and for conversion thereof into thermal energy, said method comprising:

blackening one side only of an aluminum foil, said blackening consisting of surface etching into the aluminum material of said one side of said aluminum foil in a manner and to an extent sufficient to enable the thus etched said one side to absorb thermal energy, said surface etching being conducted with application of at least one of direct current, pulsed current and alternating current.

2. A method as claimed in claim 1, wherein said blackening is sufficient to enable said one side to approximate a black body.

3. A method as claimed in claim 1, wherein said surface etching comprises subjecting said one side to an electrochemical surface etching treatment in a chloride solution.

4. A method as claimed in claim 3, wherein said solution includes at least one of an organic acid, an inorganic acid and an aluminum salt thereof.

5. A method as claimed in claim 3, wherein said solution includes at least one of phosphoric acid, oxalic acid, tartaric acid and citric acid.

6. A method as claimed in claim 1, comprising conducting said surface etching at solution temperatures in a range of between approximately 20° C. and approximately 60° C.

7. A method as claimed in claim 1, comprising applying said current at frequencies between 5 Hz and 100 Hz.

8. A method as claimed in claim 1, comprising applying said current in current pulses with a duty cycle between 0.50 and 0.95.

9. A method as claimed in claim 1, comprising applying said current at an average current density in a range between approximately 0.06 A/cm$^2$ and 1.8 A/cm$^2$.

10. A solar collector as claimed in claim 1, comprising providing said aluminum foil to have a thickness in a range of between approximately 15 μm and 300 μm.

11. A method as claimed in claim 1, further comprising providing at an opposite side of said aluminum foil means for absorbing thermal energy therefrom.

12. A method as claimed in claim 1, further comprising providing at an opposite side of said aluminum foil means for absorbing and transferring therefrom thermal energy.

* * * * *